April 19, 1955 W. F. BEGLEY 2,706,325
UNDERCUTTING UNIT FOR PRINTING PLATE
Filed Dec. 6, 1952

INVENTOR.
WILLIAM F. BEGLEY.
BY
ATTORNEY.

United States Patent Office 2,706,325
Patented Apr. 19, 1955

2,706,325

UNDERCUTTING UNIT FOR PRINTING PLATE

William F. Begley, Phoenix, Ariz.

Application December 6, 1952, Serial No. 324,446

6 Claims. (Cl. 29—21)

This invention pertains to improvements in apparatus for preparing stereotype printing plates for printing presses, and is particularly directed to an improved apparatus for undercutting the edges of curved stereotype printing plates.

One of the objects of this invention is to provide an improved undercutting unit for stereotype printing plates which is simple in construction, adapted to be applied to present equipment, and performs the machining operation in a rapid and efficient manner.

Another object of this invention is to provide an improved undercutting apparatus for stereotype printing plates having a pair of angularly disposed cutter shafts containing milling cutters for machining all types and desired angles of beveled clamping grooves at the ends of curved stereotype plates such as shown in my co-pending application, Serial No. 283,405, filed April 21, 1952.

Still another object of this invention is to provide an improved undercutting unit for printing plate having a common drive shaft, a pair of universal joints, one at each end of said shaft, connected to a pair of angularly disposed milling cutter spindles or shafts on the outer ends of which are beveled milling cutters adapted to simultaneously machine both of the end clamping bevels on a curved stereotype printing plate.

Still another object of this invention is to provide an improved undercutting unit for machining beveled clamping grooves at the ends of curved stereotype, electrotype printing plates or the like which is fully adjustable in angular and spacing relationship and which may be driven from the conventional cut-off milling device of stereotype plate-making machinery.

Further features and advantages of this invention will appear from a detailed description of the drawing of which:

Figures 1, 2:
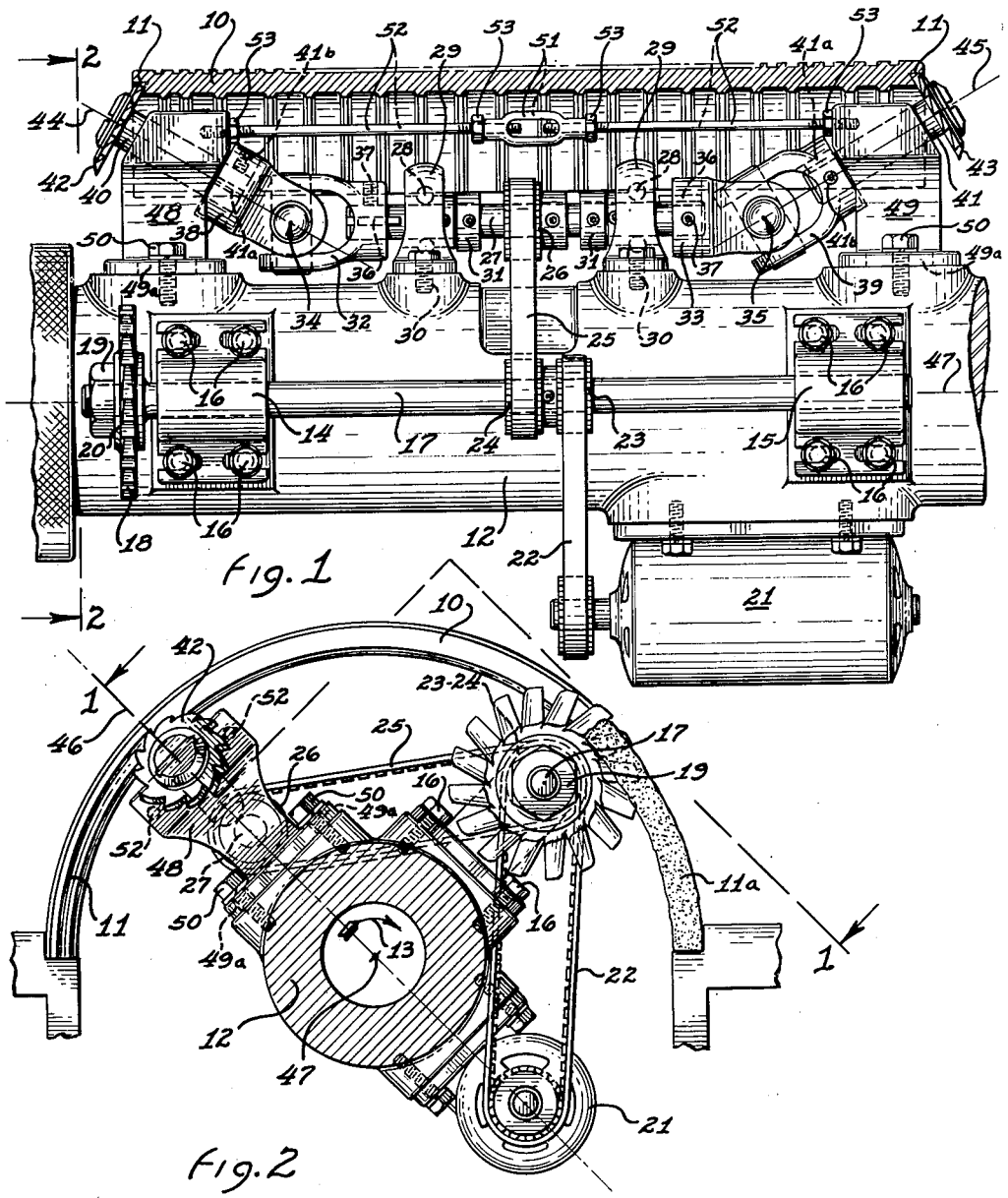
Fig. 1 is a fragmentary sectional view on the line 1—1 of Fig. 2 showing a typical stereotype plate edge finishing machine incorporating the features of this invention.
Fig. 2 is a transverse sectional view on the line 2—2 of Fig. 1.

As exemplary of one embodiment of this invention there is shown a machine for finishing the edges of curved stereotype printing plates 10 to provide the beveled undercut clamping surfaces 11 such as shown in co-pending application Ser. No. 283,405, filed April 21, 1952, for securing the plates to the printing press having the main revolving feed member 12 suitably actuated in the direction indicated by the arrow 13 in a well known manner for such machines. Mounted on the feed member 12 are suitable supports which may be integral with the member 12 or take the form of the journal boxes 14 and 15 secured to the member 12 by means of the screws 16. The main cut-off shaft 17 is journaled in these boxes and has a cut-off milling cutter 18 fixed thereon by a suitable nut 19 and washer 20. The purpose of the cutter 18 is to cut off the rough tail or surplus metal in the riser 11a from the stereotype plate formed on its upper end during the usual casting process. A source of driving power is applied directly to the cut-off shaft 17 in a conventional manner for such machines or the cut-off shaft may be driven by a motor 21 mounted on the feed member 12 which is connected through a drive chain 22 to the drive gear 23 fixed on the cut-off shaft 17.

Fixed on said cut-off shaft 17 is a second drive gear 24 which drives through a chain 25 to a gear 26 fixed in driving relationship on the shaft 27 which shaft is journaled in suitable bearings 28 in the bearing boxes 29 fixed to the feed member 12 by the screws 30, appropriately adjustably mounted thrust collars 31 on the shaft 27 serving to confine the shaft against axial movement. To the outer ends of the shaft 27 are attached the input members 32 and 33 of the respective universal joints 34 and 35, each of the members being connected in driving relationship on the shaft 27 by suitable keys 36 and secured in axial position on the shaft 27 by the set screws 37. The output members 38 and 39 of the universal joints 34 and 35 are connected to the angularly disposed cutter arbors 40 and 41 on the outer ends of which arbors are mounted the cutters 42 and 43. The arbors are arranged to rotate about axes 44 and 45 lying in a plane 46 preferably passing through the axis of rotation 47 of the feed member 12. Each of the cutters 42 and 43 have their teeth arranged to machine the desired undercut grooves 11 in the stereotype plate 10.

The cutter arbors 40 and 41 are journaled in suitable bearings in the adjustable supports 48 and 49 having elongated holes 49a extending parallel to the shaft 27 of the arbors and through which bolts 50 pass to secure the supports 48 and 49 in desired positions on the member 12. The output members 38 and 39 of the universal joints are also axially adjustable on the arbors 40 and 41 by suitable keys 41a and set screws 41b. Connecting rods comprising the turn buckles 51, the rod portions 52 threaded in the turn buckles 51 and in the supports 48 and 49 together with jam or lock nuts 53 serve to steady the outer ends of the supports 48 and 49 in any adjusted position on the member 12. Thus by this arrangement the cutters may be accurately positioned relative to each other in a direction parallel to the axis 47 of the feed member 12 and may also be positioned along the axes 44 and 45 of rotation of the arbors 40 and 41 so that the surfaces 11 may be properly positioned on the stereotype plate for effective and accurate clamping of the plates in the printing press.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In an undercutting machine for simultaneously finishing the undercut locating and clamping surfaces on the edges inside of the printing surface of a curved cylindrical printing plate having, a rotatable feed member having an axis of rotation concentric with the axis of said printing plate, a pair of angularly disposed cutter arbors rotatable about axes lying in a common plane passing through said axis of rotation of said feed member, cutters on the outer ends of said arbors adapted to simultaneously engage and machine said undercut locating and clamping surfaces on said printing plate, cutting edges on said cutters engaging said cylinder in a plane at right angles to the axes of said arbors, further cutting edges on said cutters engaging said cylinder inside of the printing surface in a line parallel to said axis of rotation of said feed member, a drive shaft journaled against axial movement on said feed member for rotation about an axis parallel to said axis of rotation of said feed member, and a universal joint connected between the ends of said drive shaft and each of said cutter arbors.

2. In an undercutting machine for finishing the locating and clamping surfaces on the edges of a curved printing plate having a rotatable feed member, a pair of angularly disposed cutter arbors rotatable about axes lying in a plane passing through the axis of rotation of said feed member, cutters on the outer ends of said arbors adapted to engage and machine said locating and clamping surfaces on said printing plate, a drive shaft journaled against axial movement on said feed member for rotation about an axis parallel to the axis of rotation of said feed member, a universal joint connected between the ends of said drive shaft and each of said cutter arbors, means for axially adjusting said universal joints on said drive shaft, and means for axially adjusting said cutter arbors relative to said universal joints.

3. In an undercutting machine for finishing the locating and clamping surfaces on the edges of a curved printing plate having a rotatable feed member, a pair of angularly disposed cutter arbors rotatable about axes lying in a plane passing through the axis of rotation of said feed member, cutters on the outer ends of said arbors adapted to engage and machine said locating and clamping surfaces on said printing plate, a drive shaft journaled against axial movement on said feed member for rotation about an axis parallel to the axis of rotation of said feed member, a universal joint connected between the ends of said drive shaft and each of said cutter arbors, supports on said feed member adjustable axially of said feed member, and journal bearing means in said supports carrying said cutter arbors.

4. In an undercutting machine for finishing the locating and clamping surfaces on the edges of a curved printing plate having a rotatable feed member, a pair of angularly disposed cutter arbors rotatable about axes lying in a plane passing through the axis of rotation of said feed member, cutters on the outer ends of said arbors adapted to engage and machine said locating and clamping surfaces on said printing plate, a drive shaft journaled against axial movement on said feed member for rotation about an axis parallel to the axis of rotation of said feed member, a universal joint connected between the ends of said drive shaft and each of said cutter arbors, supports on said feed member adjustable axially of said feed member, journal bearing means in said supports carrying said cutter arbors, connecting rod means interconnected between said supports and extending parallel to said drive shaft including turn buckles intermediate the ends of said rod means, and jam nut means to secure said rods and turn buckles in any adjusted position of said supports on said feed member.

5. In an undercutting machine for simultaneously finishing the locating and clamping surfaces on the edges of a curved cylindrical printing plate having, a rotatable feed member having an axis of rotation concentric with the axis of said printing plate, a pair of angularly disposed cutter arbors rotatable about axes lying in a common plane passing through said axis of rotation of said feed member, cutters on the outer ends of said arbors adapted to engage and machine said locating and clamping surfaces on said printing plate, cutting edges on said cutters engaging said cylinder in a plane at right angles to the axes of said arbors, further cutting edges on said cutters engaging said cylinder inside of the printing surface in a line parallel to said axis of rotation of said feed member, a drive shaft journaled against axial movement on said feed member for rotation about an axis parallel to the axis of rotation of said feed member, a universal joint connected between the ends of said drive shaft and each of said cutter arbors, and a source of driving power on said feed member connected to rotate said drive shaft.

6. In an undercutting machine for simultaneously finishing the locating and clamping surfaces on the edges of a curved cylindrical printing plate having, a rotatable feed member having an axis of rotation concentric with the axis of said printing plate, a pair of angularly disposed cutter arbors rotatable about axes lying in a common plane passing through said axis of rotation of said feed member, cutters on the outer ends of said arbors adapted to engage and machine said locating and clamping surfaces on said printing plate, cutting edges on said cutters engaging said cylinder in a plane at right angles to the axes of said arbors, further cutting edges on said cutters engaging said cylinder inside of the printing surface in a line parallel to said axis of rotation of said feed member, a drive shaft journaled against axial movement on said feed member for rotation about an axis parallel to the axis of rotation of said feed member, a universal joint connected between the ends of said drive shaft and each of said cutter arbors, a main cut-off shaft journaled on said feed member, a cutter on said main cut-off shaft arranged to cut off the rough slag riser of said stereotype plate power transmission means between said main cut-off shaft and said drive shaft, and a source of driving power connected to said main cut-off shaft.

References Cited in the file of this patent

UNITED STATES PATENTS

| 1,238,973 | Wood | Sept. 4, 1917 |
| 2,626,541 | Richards et al. | Jan. 27, 1953 |

FOREIGN PATENTS

| 11,549 | Great Britain | May 15, 1909 |